(12) United States Patent
Benton et al.

(10) Patent No.: US 6,820,880 B2
(45) Date of Patent: Nov. 23, 2004

(54) SPRING POWERED WHEELBARROW

(76) Inventors: Nick Charles Benton, 1035 SW. Sunset Dr., Corvallis, OR (US) 97333; Michael Lee Gray, 3365 Crocker La., Albany, OR (US) 97321

( * ) Notice: Subject to any disclaimer, the term of this patent is extended or adjusted under 35 U.S.C. 154(b) by 0 days.

(21) Appl. No.: 10/269,443

(22) Filed: Oct. 11, 2002

(65) Prior Publication Data

US 2003/0217875 A1 Nov. 27, 2003

Related U.S. Application Data

(60) Provisional application No. 60/383,079, filed on May 24, 2002.

(51) Int. Cl.[7] ............................................... B62B 1/00
(52) U.S. Cl. ..................... 280/47.31; 298/3; 185/40 H; 185/39; 180/212
(58) Field of Search .......................... 280/47.131, 47.17, 280/47.24, 47.26, 47.31, 47.33, 47.3, 652, 653, 654, 659, 47.12, 47.32; 180/19.1, 19.2, 19.3, 212; 298/2, 3; 185/40 R, 40 H, 9, 10, 37, 39

(56) References Cited

U.S. PATENT DOCUMENTS

| | | | | |
|---|---|---|---|---|
| 76,814 A | * | 4/1868 | Rhoads | 185/37 |
| 92,306 A | * | 7/1869 | Hares | 185/41 R |
| 337,975 A | * | 3/1886 | Morgan | 185/10 |
| 385,881 A | * | 7/1888 | Sinkler | 280/215 |
| 424,903 A | * | 4/1890 | Rogers | 280/215 |
| 1,887,427 A | * | 11/1932 | Porcello | 280/5.28 |
| 2,262,903 A | * | 11/1941 | Peterson | 298/3 |
| 2,710,674 A | * | 6/1955 | Duncan | 185/37 |
| 2,716,031 A | * | 8/1955 | Roessler | 280/47.31 |
| 2,965,393 A | * | 12/1960 | Cauchon | 280/212 |
| 3,125,997 A | * | 3/1964 | Corley | 123/185.14 |
| 6,286,631 B1 | * | 9/2001 | Kimble | 188/19 |
| 6,390,213 B1 | | 5/2002 | Bleicher | 180/65.1 |

* cited by examiner

Primary Examiner—Bryan Fischmann
(74) Attorney, Agent, or Firm—James F. Harvey, III (57) ABSTRACT

The present invention provides a spring powered wheelbarrow with a manually powered drive assembly. A foot crank winds a spring through a system of shafts and sprockets in a first direction. By releasing a brake upon a front wheel of a wheelbarrow, the wound spring transfers a rotational movement from a spring shaft to a freewheel sprocket adjacent to the front wheel, the rotational movement upon the front wheel assisting a user in pushing the wheelbarrow.

19 Claims, 6 Drawing Sheets

SPRING POWERED WHEELBARROW

CROSS-REFERENCES TO RELATED APPLICATIONS

This patent application claims the benefit of U.S. Provisional Application No. 60/383,079, filed May 24, 2002, of similar title.

BACKGROUND OF THE INVENTION

The present invention relates to the field of small wheeled vehicles, and more specifically, it is concerned with a self-propelled wheelbarrow driven without the use of a motor or electric power.

Laborers in a variety of industries frequently use wheelbarrows and carts to manually move heavy or awkward loads about a work site. For example, in commercial settings construction workers may use wheelbarrows to transport supplies, waste debris, mixed concrete, and other materials as needed from point to point. In private settings, landscapers and gardeners may use wheelbarrows to aid in transporting rocks, soil and potting material, and other tools from a supply location to a work site.

The wheelbarrow has been known in one form or another since early civilization. It generally consists of a carrying enclosure such as a tub or box supported by two parallel handles, the handles being supported by the axis of a wheel serving as a fulcrum on one end and being lifted and pushed by a person holding the opposing end. The single wheel allows the load in the tub to be pushed and easily maneuvered along the ground around challenging obstacles. The size of the load carried in this manner is limited by the ability of the person pushing the wheelbarrow to vertically lift the load mass and then to apply horizontal force to cause the wheelbarrow to roll about its wheel axis along the ground. The horizontal force required to move the loaded wheelbarrow can be increased by obstacles on the ground that impede the rolling action of the wheel (such as rocks, ridges, uneven ground, tools, etc.) or grades. Engines and motors have sometimes been added to the wheelbarrow structure to assist the wheelbarrow user in moving the wheelbarrow horizontally over these obstacles and grades by applying an additional, cooperative driving force to the wheels.

For example, U.S. Pat. No. 6,390,213, issued to Bleicher, discloses a self-propelled cart powered by motors that power independent drive wheels so that each wheel thus equipped with its own motor assists the user in moving the cart over rough or uneven surfaces. The motors are powered by electrical means such as batteries. U.S. Pat. No. 2,918,133, issued to Ericsson, discloses a barrow or cart also propelled by a gasoline-powered engine driving a single front axle having dual wheels.

Such modifications as adding engines and motors to the basic wheelbarrow configuration greatly assist the user in moving heavy loads. However, there are a number of drawbacks to such arrangements. First, motors and engines are generally more expensive than the wheelbarrow structure itself. When factoring in the cost of buying a whole new wheelbarrow along with the assisting mechanisms, the expense becomes even more cumbersome. Second, engines and motors are heavy and bulky and contribute to the weight of the combined wheelbarrow structure and load. Third, the use of the engine or motor imposes a requirement to have a readily available source of fuel. In the case of an engine, gasoline or some other such volatile liquid must be provided; in the case of a motor, the battery must be recharged when it is depleted. In either case, the fuel source must accompany the wheelbarrow or cart when using the apparatus in a remote area. Fourth, use of engines and motors increases the complexity of the apparatus. Engines in particular must be maintained and serviced at periodic intervals. Fifth, an engine is frequently noisy and creates air pollution from the exhaust fumes.

Thus, it can be seen that there is a need for an wheelbarrow apparatus to assist the user in moving heavy loads around obstacles and up steep grades, the apparatus being inexpensive, simple to maintain, lighter than standard motors and engines, quiet, nonpolluting, and requiring a readily available or renewable source of fuel. It can also be seen that such technology should be available to retrofit existing wheelbarrows to reduce the cost of redundantly purchasing the wheelbarrow itself.

SUMMARY OF THE INVENTION

The present invention achieves its intended purposes, objects, and advantages through a new, useful, and unobvious combination of component elements, with the use of a minimum number of functioning parts, at a reasonable cost to manufacture, and by employing only readily available materials. In these respects, the present version of the invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

In one aspect of the invention, a spring powered drive apparatus is provided for a vehicle having at least one wheel. The apparatus is comprised of a drive assembly and a braking assembly. The drive assembly is further comprised of a drive spring for storing and releasing rotational force, crank for manually applying manual rotational force to the drive spring, a first power transmission means to transmit the rotational force applied to the crank to the drive spring for storage of rotational energy, and a second power transmission means to transmit the stored rotational force to a wheel of the vehicle. The braking assembly allows an operator selectively to prevent movement of the wheel or to allow the wheel to rotate freely under the urging of the second power transmission means.

In another aspect of the invention, a manually powered vehicle is provided for a vehicle with at least one wheel rotating on an axle. The vehicle has a drive assembly comprising an drive spring supported on a spring shaft by a fixed hub at a first end of the drive spring and a movable hub at a second end of the drive spring, with the fixed hub arranged to restrain rotational movement of the drive spring and the movable hub arranged to allow rotational movement of the drive spring. A manually powered crank is provided along with a first drive means disposed to communicate rotational force provided by movement of the crank to the movable hub in a direction that winds the drive spring and a second drive means disposed to communicate the stored rotational force exerted by the drive spring on the movable hub to the wheel. A braking assembly is also provided for selectively preventing rotational movement of the wheel and allowing the wheel to rotate freely.

In another aspect of the invention, the present invention provides a wheelbarrow with a manually powered drive assembly, the wheelbarrow comprising a load bearing container, a frame with rails supporting the container at a distance from a horizontal surface, rails positioned intermediate the front and back ends and a transversely mounted wheel positioned at the front end. The drive assembly features a drive assembly frame affixed to the underside of the load bearing container, the frame transversely and fixedly supporting a spring shaft. A drive spring is transversely mounted over the spring shaft, the drive spring positioned under the load bearing container. A drive shaft supports a crank sprocket, transversely supported by and rotating within the drive assembly frame. The drive shaft is manually rotated by foot crank located on the right end of the drive shaft, as viewed from the handle area of the apparatus. The crank sprocket is connected by a first power transmission means to a spring sprocket on the spring shaft. The spring shaft rotates the drive spring, extending or elongating the drive spring against a spring hub, the spring hub guided along spring keepers. The drive spring has a first end constrained from rotational movement and a second end rigidly connected to a rotating hub axially supported by the spring shaft. Thus, an incremented turn of the pedal extends the drive spring so that the drive spring unwinds from its natural position and builds potential energy. Elongate handles are engaged to elevate the rails of the frame at a distance from a horizontal surface. The elongate handles span a back end of the apparatus to a front end of the apparatus substantially under the container. A handle has a hand brake comprising a vertically oriented lever, a brake rod passing below the container and above the frame, and a brake shoe connected to the brake rod so that the plate rubs upon a front wheel and frictionally holds the apparatus in a dormant state. The apparatus moves upon release of a locking pin on the hand brake, disengaging the friction plate from the front wheel. As the locking pin is released, the drive spring returns to its original position, rotating the spring shaft and the spring sprocket in an opposite direction, turning a second power transmission means connected to the freewheel sprocket at the front of the apparatus by a drive chain. The freewheel sprocket rotates a wheel shaft, which turns the wheel so that forward motion of the apparatus is accomplished.

These and other features, aspects and advantages of the present invention will become better understood with reference to the following drawings, description and claims. For a better understanding of the invention, its operating advantages and the specific objects attained by its uses, reference should be made to the accompanying drawings and descriptive matter in which there are illustrated preferred embodiments of the invention. The foregoing has outlined some of the more pertinent objects of the invention. These objects should be construed to be merely illustrative of some of the more prominent feature and applications of the present invention. Many other beneficial results can be attained by applying the disclosed invention in a different manner or by modifying the invention within the scope of the disclosure. Accordingly, other objects and a fuller understanding of the invention and the detailed description of the preferred embodiments in addition to the scope of the invention illustrated by the accompanying drawings.

DETAILED DESCRIPTION OF THE INVENTION

The following detailed description shows the best currently contemplated modes of carrying out the invention. The description is not to be taken in a limiting sense, but is made for the purpose of illustrating the general principles of the invention and the best mode for practicing the invention, since the scope of the invention is best defined by the appended claims.

The invention provides a manually operated apparatus for use with a wheeled vehicle, and in particular, with a wheelbarrow, to assist the operator in overcoming the inertia of the vehicle when the vehicle is heavily loaded. The apparatus is manually operable by the a person so that heavy engines or batteries and motors are not required to provide motive power. Furthermore, the apparatus does not require an external fuel supply which makes its use advantageous in areas where fuel is unavailable. It is simple, light, and easily maintainable by a person having minimal mechanical skills. It is believed that the prior art does not teach or suggest the invention either taken alone or in combination with other prior art.

Figure 1:
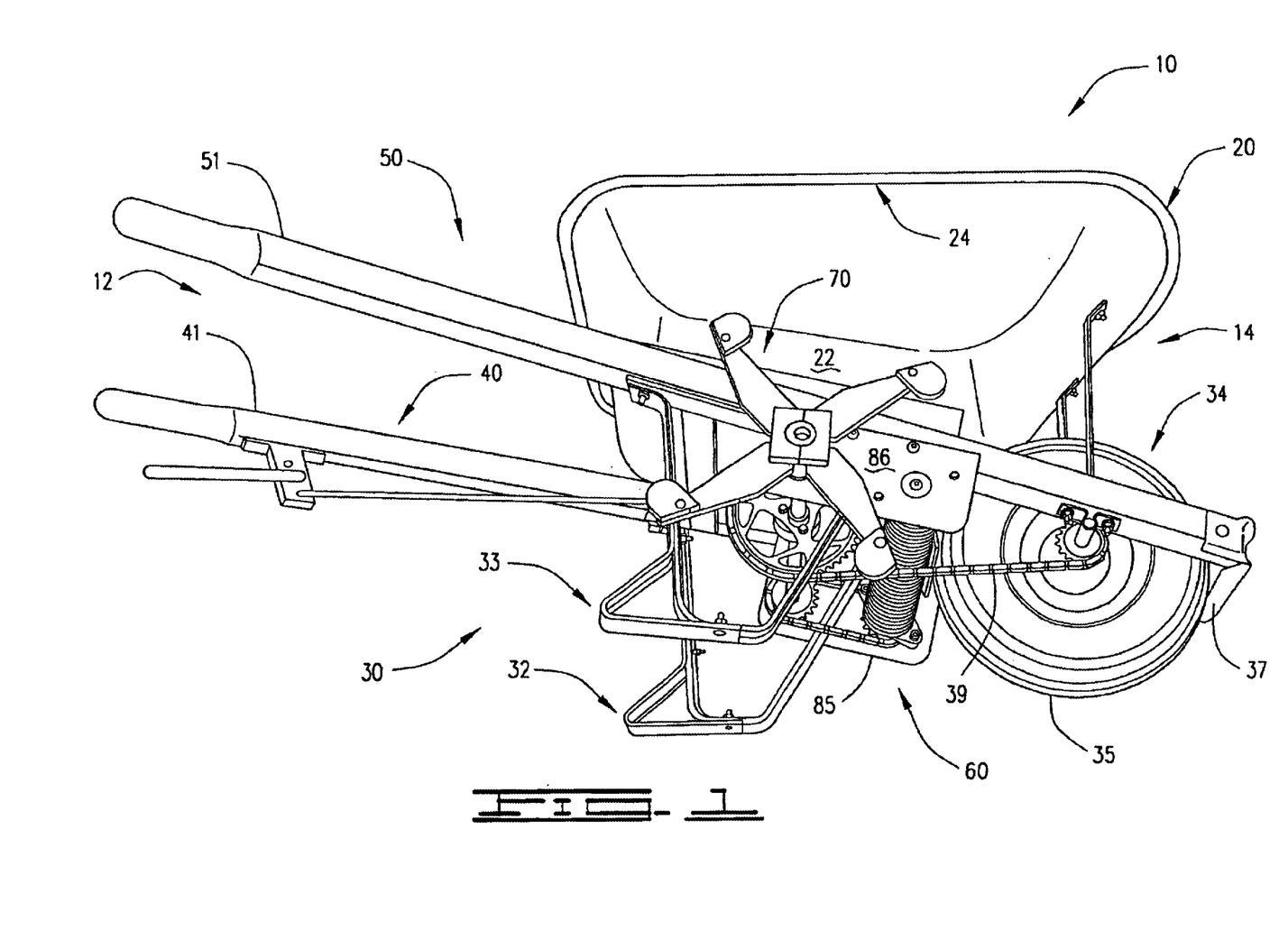
FIG. 1 is a lower elevation of the underside of a wheelbarrrow to which the inventive apparatus is attached, according to an embodiment of the invention.

Referring initially to FIG. 1, an embodiment 10 of the invention is shown as applied to a wheel barrow of standard design known to those skilled in the art. The wheel barrow is viewed in FIG. 1 from its right side and is shown as comprising a load bearing container 20, frame 30, wheel 35, and supports consisting of right support 32 and left support 33. Load bearing container 20 may be constructed of high density plastic, steel, or any other material that has the capacity and durability to carry heavy or awkwardly displaced loads. Frame 30 is shown as being comprised of a right elongate member 50 and a left elongate member 40. To the underside of each member 40, 50 are attached left support 32 and right support 33, respectively, which maintain the frame 30 in spaced relationship with a horizontal surface, typically the ground, and which carry the load presented by the load bearing container 20 when it is resting on the horizontal surface. The ends of members 40, 50 opposite the handles 41, 51 support wheel 35 in rolling relation with the horizontal surface, thereby providing a stable, three point supporting structure for the load bearing container 20 and its contents; the ends supporting wheel 35 are rigidly held together by bracket 37. An inventive drive assembly 60, which will be presently described, may be attached to the underside of frame 30 between the load bearing container 20 and the horizontal surface. It communicates its rotational force to wheel 35 by means of drive chain 39.

Drive assembly 60 is a device for storing manual energy provided by the efforts of an operator and making that energy available to assist movement of the wheel barrow over the horizontal surface. This may be accomplished by communicating that energy to the wheel 35 to urge it into clockwise movement (with relationship to the right side depicted in FIG. 1) through a first power transmission means. Drive chain 39 comprises the first power transmission means in the embodiment shown, although it should be recognized that any suitable means known to the art for transferring rotational force from one sprocket to another may be used. Suitable devices for use as drive chain 39 which are within the scope of the invention may be a bicycle chain, a rubber belt, a pulley and cable arrangement, or a gear arrangement. Conditioning drive assembly 60 for operation may consist of a two step process, where the operator first causes a drive spring to be loaded by a winding means, thus storing the winding force as spring energy, and then secondly allowing that spring energy to assist the rotation of wheel 35. Although the winding means may be driven by pneumatic or gasoline powered engine, the embodiment shows the winding means being driven by a foot-powered crank. In this way, a simple arrangement may be provided for accumulation of motive energy, thus avoiding complicated pneumatic arrangements that might employ gas tanks and hoses or engine powered arrangements that might employ noisy, pollution prone engines; also, the embodiment shown avoids the necessity of having an external fuel supply available for powering pneumatic or engine arrangements, the drive assembly 60 relying instead on readily available muscle power.

Figure 2:
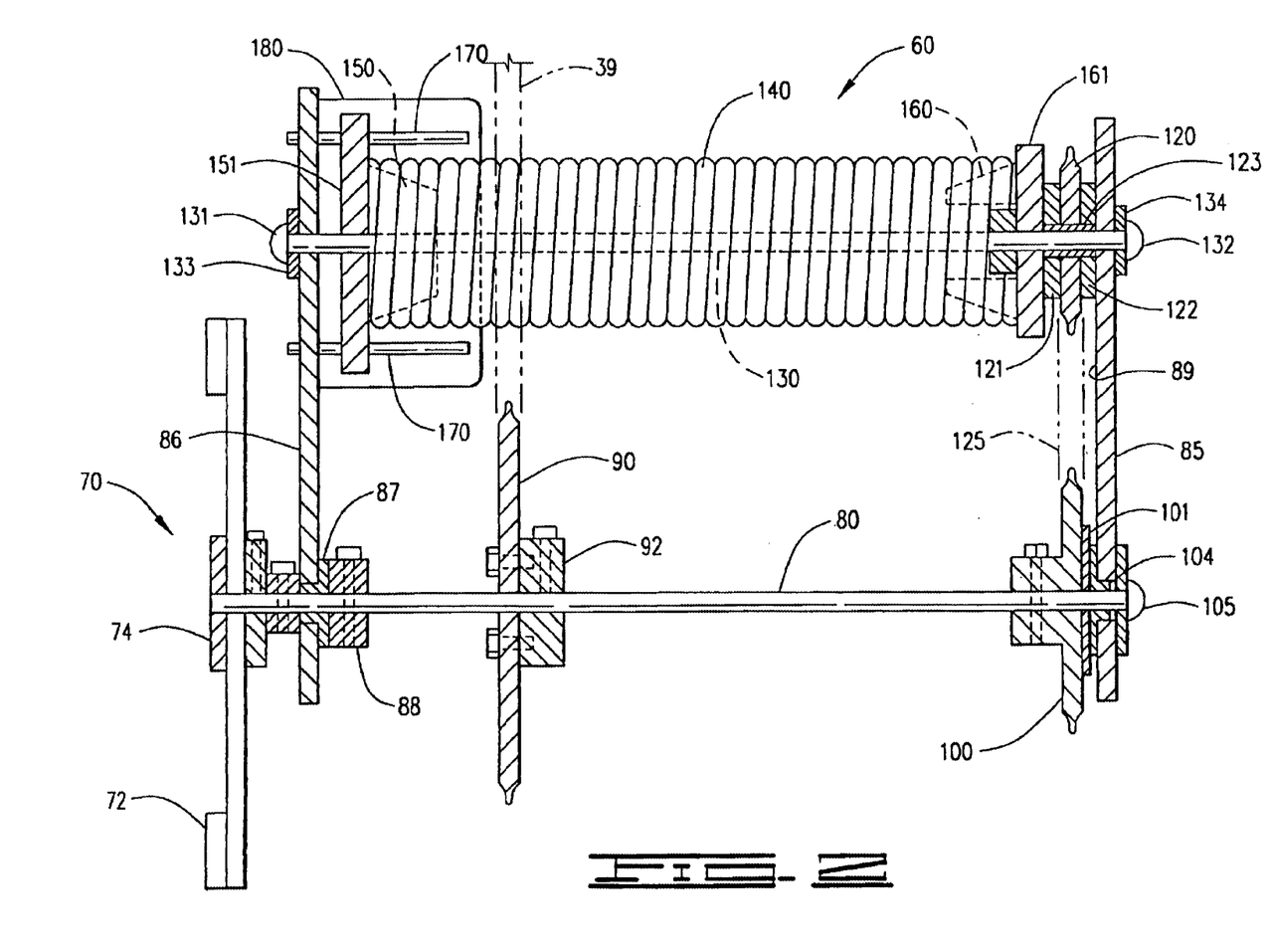
FIG. 2 is a cross-sectional drawing of the driving mechanism of the invention, according to an embodiment of the invention.

Referring to FIG. 2, a view of drive assembly 60 is given along the plane formed by its two shafts, drive shaft 80 and spring shaft 130, and viewing the apparatus from its underside. The shafts 80, 130 are transversely supported by left frame plate 85 and right frame plate 86, each of which are vertically oriented and rigidly attached by any convenient means to the underside of the frame 30 (FIG. 1).

Drive shaft 80 protrudes from insertion through a hole in frame plate 86 where it supports a crank 70 attached thereto, crank 70 held in rigid connection with drive shaft 80 by a collar 74. Crank 70 may be positioned to be easily engageable by the right foot of an operator oriented slightly to the right side of the apparatus and to the rear 12, for rotational movement thereof through action of the operator's leg and foot. The operator steps downwardly upon a prong 72, thus turning the crank 70 along with drive shaft 80 in a counterclockwise direction. Sufficient prongs 72 may be provided for crank 70 to easily turn the crank 70 with a foot without undue hardship. Drive shaft 80 is journaled through right frame plate 86, where it may be supported for rotational movement within the frame plate by a bushing 87 and secured by a collar 88, which allows shaft 80 to rotate without sliding axially through plate 85.

Figure 8:
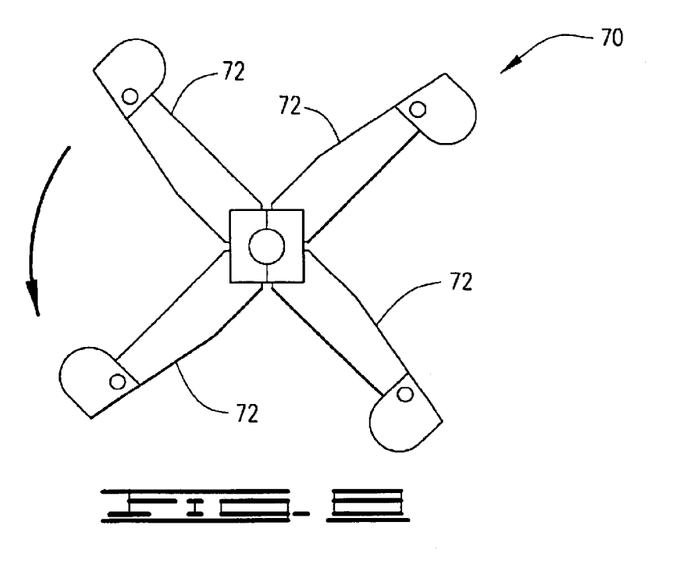
FIG. 8 is a view of a four pronged crank, according to an embodiment of the invention.
Figure 9:
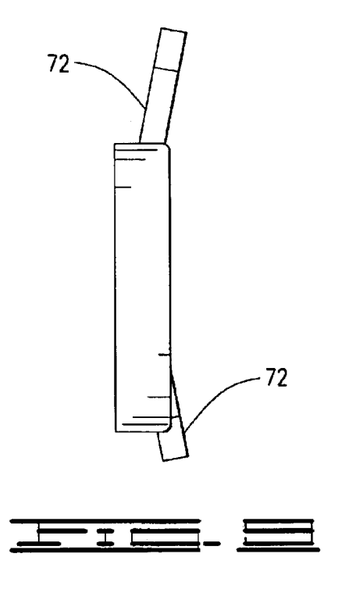
FIG. 9 is a side view of a crank with a protective hub and showing the angled aspect of the prongs, according to an embodiment of the invention.
Figure 10:
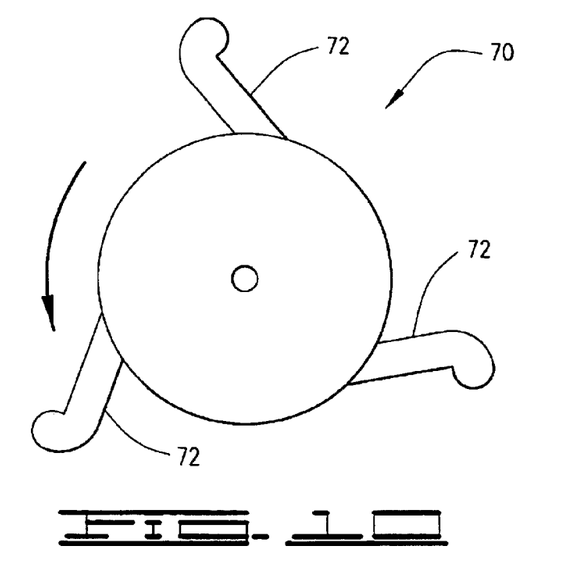
FIG. 10 is a view of a three pronged crank with the protective hub, according to an embodiment of the invention.

It should be noted that, although a four prong crank 70 is shown in FIG. 1, crank 70 may have any reasonable number of prongs without departing from the scope of the invention. FIG. 8 shows an embodiment with four prongs 72 and FIG. 10 shows a similar embodiment with three prongs 72. Also other attachments may be made to the crank 70 to improve its usability. For example, FIGS. 9 and 10 show a three prong crank 70 with a protective hub attached to the distal end of the drive shaft 80 upon which the crank 70 is attached; such a protective hub may be used to prevent a user's pants legs from becoming entangled in the mechanism of the invention.

Drive sprocket 90 may be mounted intermediate the ends of drive shaft 80 and held thereto by a locking collar 92 which may be laterally screwed into and secured to drive sprocket 90 and then rigidly secured to shaft 80 with a bolt through the shaft (not shown) so that it rotates along with drive shaft 80. Drive chain 39 may be mounted and engaged about drive sprocket 90 for transmitting rotational movement of drive sprocket 90 to wheel 39, as will be presently seen. The opposite end of shaft 80 from the crank 70 may be journaled through left end plate 85 by means of a bushing 104. It may be held for rotational movement through left end plate 85 by securing washer 106 by bolt 105 to the end of drive shaft 80. A crank sprocket 100 may be secured to the drive shaft 80 adjacent to the interior surface 89 of left frame plate 85 and maintained at a distance therefrom by spacer 101. A second power transmission means communicates rotational force exerted by crank sprocket 100 to drive sprocket 120. In the embodiment shown, a spring chain 125 is mounted upon and engages the teeth in crank sprocket 100. Spacer 101 prevents spring chain 125 from contact with the interior surface 89 of left frame plate 85. It should be recognized that, as with the first power transmission means, any suitable means known to the art for transferring rotational force from one sprocket to another may be used. Suitable devices for use as spring chain 125 which are within the scope of the invention may be a bicycle chain, a rubber belt, a pulley and cable arrangement, or a gear arrangement.

Spring shaft 130 may be mounted in a fixed arrangement to the frame plates 85, 86 and held in place on either end by a bolts 131, 132 inserted through washers 133, 134, respectively. Spring sprocket 120 positioned on spring shaft 130 in close proximity with frame plate 85 and spaced a distance from frame plate 85 by spacer 122 so that spring chain 125 does not come into contact with frame plate 85. Spring chain 125 closely encircles both spring sprocket 120 and drive sprocket 100. Spacers 121, 122 are positioned on either side of spring sprocket 120 so that spring sprocket 120 may be maintained in alignment with drive sprocket 100 and spring chain 125 may be positioned in a plane substantially parallel with frame plate 85. Bushing 123 may be axially inserted through spacer 122, spring sprocket 120, and spacer 121 so that they may rotate freely about spring shaft 130.

Drive spring 140 is provided for storage and release of rotational force. Although many different types of springs may be employed for use as drive spring 140, it is preferably an elongate coil spring such as those typically in use for garage door openers. Drive spring 140 encloses spring shaft 130 which may be inserted therethrough. Each end of drive spring 140 may be frictionally engaged to tapered hubs 150, 160 so as to prevent each end of the drive spring 140 from rotating about its respective tapered hub 150, 160. The base 151 of hub 150 has holes on either side through which L-shaped rails 170 are inserted. One end of each L-shaped rail 170 may be inserted through a hole in frame plate 86 and the other end may be welded or similarly affixed to a rail platform 180 which may be affixed to and may extend perpendicularly from frame plate 86. The L-shaped rails 170 allow for changes in length of the drive spring 140 as it is tightened and released by permitting base 151 attached to one end of the drive spring 140 to move longitudinally along L-shaped rails 170 without permitting base 151 to rotate about spring shaft 130. Base 151 thus provides a stable platform against which drive spring 140 may be tightened radially while permitting the drive spring 140 to change length longitudinally. The opposite end of drive spring 140 may be wound by rotational action of hub 160 about spring shaft 130. This may be accomplished by affixing spring sprocket 120 to the base 161 of hub 160 by standard means known to those skilled in the art, such as bolts, screws, welding, etc. In this manner, a counterclockwise rotational action about spring shaft 130 (as observed from the right side of apparatus 10) urged by spring chain 125 about spring sprocket 120 may be transferred to hub 160, resulting in a winding action upon drive spring 140. Similarly, an unwinding action of drive spring 140 results in a clockwise rotational movement of hub 160, resulting in a corresponding clockwise rotational movement of spring sprocket 120.

Figure 3A:
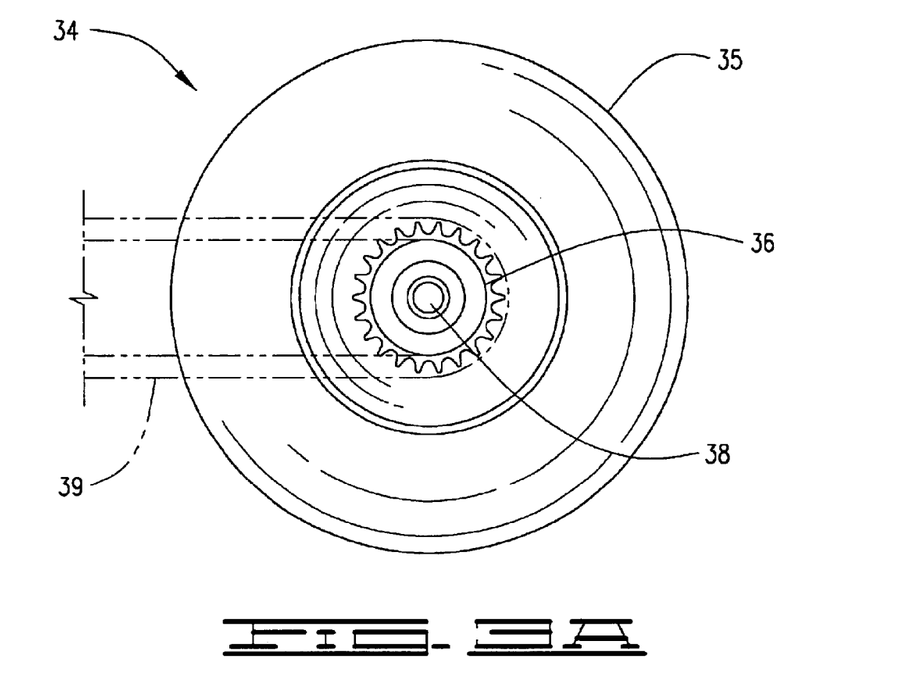
FIG. 3A is a detailed view of the front wheel taken from the right side of the wheelbarrow showing the sprocket and chain arrangement, according to an embodiment of the invention.
Figure 3B:
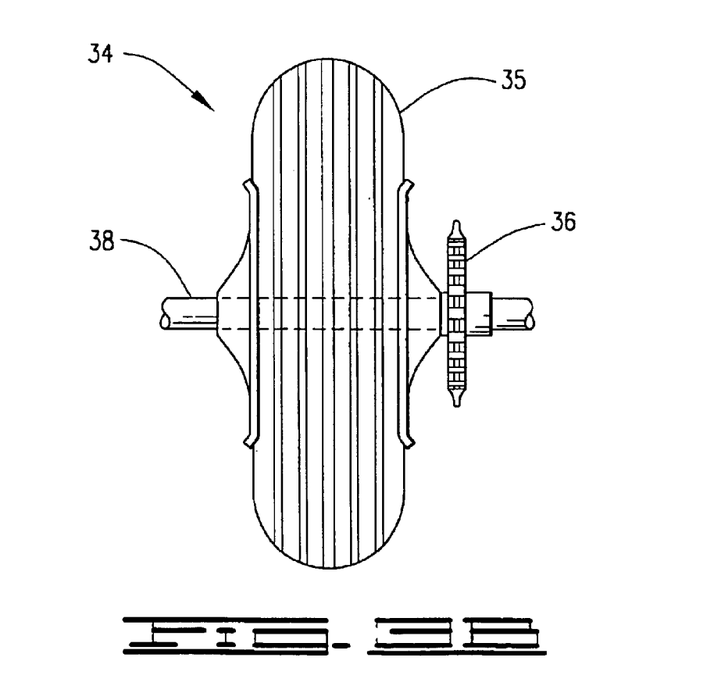
FIG. 3B is a detailed view of the front wheel as viewed from the handle area of the wheelbarrow showing the manner in which the sprocket is attached to the hub, according to an embodiment of the invention.

Power from the drive spring 140 may be transferred by drive chain 39 to the wheel assembly 34 located at the front end 14 of the apparatus 10 (FIGS. 3A and 3B). Wheel 35 rotates about an axle 38 which has been inserted through a threaded hub extension 42 having clockwise threads for receiving a bicycle freewheel sprocket 36 tightened thereto. The chain 39 may be inserted about the freewheel sprocket 36 so that when the freewheel sprocket 36 is urged into clockwise rotational movement, the power exerted by the chain 39 may be transferred by the freewheel sprocket 36 to the wheel 35 for forward motion of the apparatus 10. However, when the motion of chain 39 is reversed so that freewheel sprocket 36 is urged into counterclockwise rotation, the freewheel sprocket 36 rotates freely about its axis about axle 38. In a similar manner, if chain 39 is immobile and the apparatus 10 is moved in a backwards direction towards its rear end 12 so that wheel 35 rotates in a counterclockwise direction, then the freewheel sprocket 36 locks, which causes shaft 80 to wind the drive spring in a counterclockwise motion as if crank 70 were being used to wind the drive spring 140. In other words, backing the wheelbarrow results in a winding action for drive spring 140 and may have the same effect as winding drive spring 140 with crank 70.

It should be noted at this point that although the means for communicating the rotational force provided by the drive assembly 60 to the wheel 35 is shown in this embodiment as a chain, such as that normally found on a bicycle, other means may be used for this purpose without departing from the scope of the invention. For example, a rubber belt, either having ridges serving as teeth or being smooth for frictional engagement with the wheel shaft or a suitably configured hub, may be employed in this application. Other means contemplated for the invention would be, for example, a cable and pulley arrangement, a set of large gears, or direct attachment of the drive assembly 60 to the axle of wheel 35.

Figures 4A, 4B:
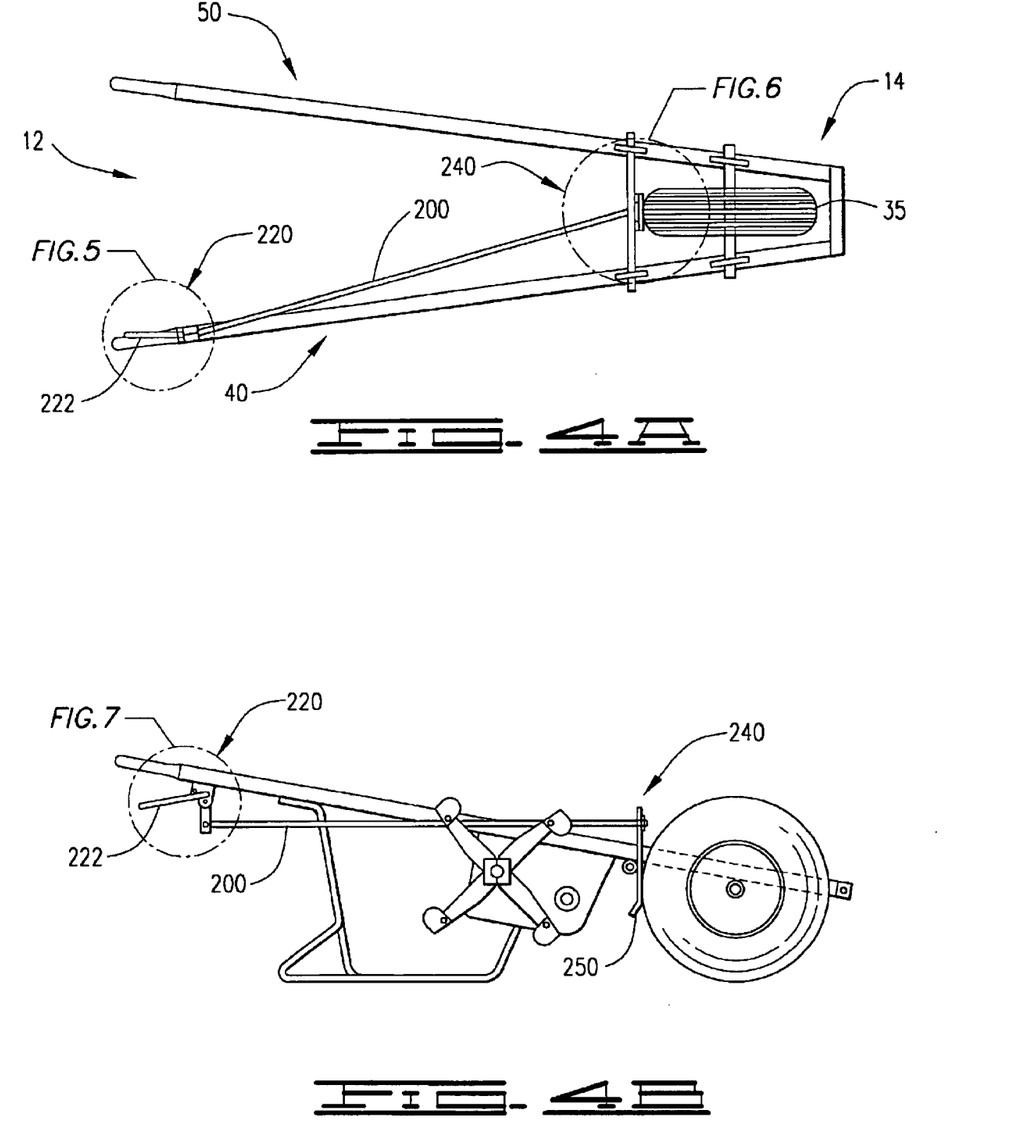
FIG. 4A is a detailed view of the braking mechanism of the apparatus as seen from the underside of the wheelbarrow looking up, according to an embodiment of the invention.
FIG. 4B is a detailed cutaway view of the braking mechanism of the apparatus with the right supporting structure removed for better visibility, according to an embodiment of the invention.
Figure 5:
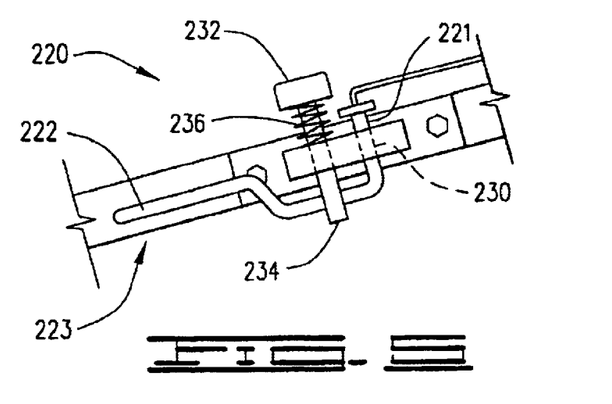
FIG. 5 is a detailed view of the brake handle assembly and locking means as seen from the underside of the apparatus, according to an embodiment of the invention.
Figure 6:
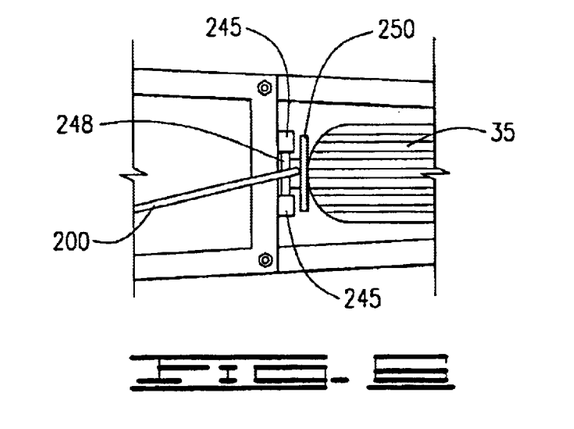
FIG. 6 is a detailed view of the braking assembly as seen from the underside of the apparatus, according to an embodiment of the invention.
Figure 7:
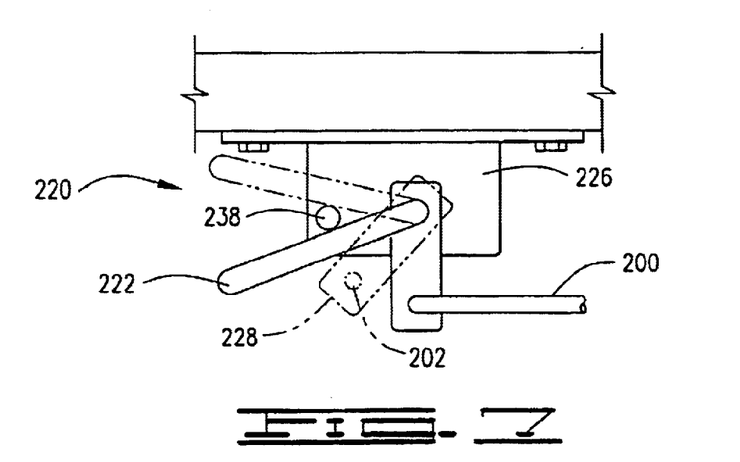
FIG. 7 is a side view of the handle assembly and locking means as seen from the side, according to an embodiment of the invention.

Referring now to FIGS. 4A and 4B, the brake system is shown in FIG. 4A from a viewpoint under the apparatus 10 looking upwardly, and FIG. 4B shows the brake system from the right side of the apparatus 10. The brake system for apparatus 10 comprises a solid brake rod 200 extending between a brake handle assembly 220 (shown in more detail in FIGS. 5 and 7) and a braking assembly 240 (shown in more detail in FIG. 6). Brake handle 222 may be attached to the brake handle assembly 220 for placing the brake system in an engaged position and in a disengaged position. End 223 of brake handle 222 provides a convenient gripping surface for the operator's left hand, and end 221 of brake handle 222 may be inserted through pivot hole 230 in housing 226, which serves as a pivot point for up and down movement of brake handle 222. End 221 of brake handle 222 may be fixedly attached to one end of arm 228 at roughly a 90° angle. The other end of arm 228 may be pivotably attached to an end of the brake rod 200, so that the end of brake rod 200 pivots within the hole 202 in arm 228 as it is articulated by the movement of brake handle 222.

The braking assembly 240 may support a brake shoe 250 so that it may be brought firmly in contact with wheel 35 for braking action or moved away from wheel 35 for no braking action, as required. The brake shoe 250 may be welded to a transverse brake shoe pivot rod 248 about which brake shoe 250 pivots. The ends of brake shoe pivot rod 248 may be inserted into metal bushings 245 which are welded onto a metal portion of the frame of apparatus 10 to allow brake shoe pivot rod 248 to serve as an axis of rotation. The brake shoe 250 may be articulated for movement by brake rod 200, where an end of brake rod 200 may be fixedly attached to the upper end of brake shoe 250 by any suitable means well known to those familiar with the art, e.g. insertion through a hole and engaged with a cotter pin.

In operation, the brake is engaged by upward movement by the operator on brake handle 222, causing the end of arm 228 to which the end of brake rod 200 is attached to pivot clockwise, thus pulling brake rod 200 towards the rear 12 of apparatus 10. This rearward movement is translated to the opposite end of brake rod 200 which is attached to the brake shoe 250, causing brake shoe 250 to pivot in a counterclockwise direction, bringing the lower end of brake shoe 250 into firm contact with tire 35 to frictionally prevent its rotation. When engaging the brake, brake handle 222 may be moved above the locking pin hole 238 and the locking pin 234 may be inserted through locking pin hole 238 to capture the brake handle 222 between the locking pin 234 and the left elongate member 40. Locking pin hole 238 may be located in housing 226 so the brake handle 222 may be engaged with sufficient force so that the resilient action of wheel 35 against brake shoe 250 may provide a force tending to pull brake handle 222 downwardly against locking pin 234; this resilient action translates into a frictional pressure exerted by brake handle 222 against locking pin 234 that is greater that the force exerted by lock spring 236 against locking pin 234. When brake handle 222 is pulled upwardly further than locking pin hole 238 so that pressure against locking pin 234 is released, then lock spring 236 may pull locking pin 234 out of locking pin hole 238 to return it to an unlocked position.

The brake may be disengaged by reversing the process. If the brake is locked by locking pin 234, then brake handle 222 may be moved upwardly to release frictional pressure on locking pin 234 so that lock spring 236 urges locking pin 234 out of locking pin hole 238 to provide an unobstructed path for downward movement of brake handle 222. Then brake handle 222 may be moved downwardly, rotating counterclockwise within pivot hole 230 and simultaneously rotating arm 228 counterclockwise. This action moves brake rod 200 towards the front end 14 of the apparatus 10 to apply a forwardly directed pressure against brake shoe 250, causing brake shoe 250 to rotate clockwise about brake shoe pivot rod 248 away from tire 35 to release frictional pressure applied by brake shoe 250 thereon. With frictional pressure from brake shoe 250 removed from wheel 35, then the force provided by drive assembly 60 to wheel 35 by drive chain 39 may be allowed to provide a clockwise torque to wheel 35.

To operate the apparatus 10, the brake assembly 240 may be first engaged by the action of brake handle 222, described previously, to hold wheel 35 immobile through frictional force. The brake handle assembly 220 may be locked through action of locking pin 234, described previously, to maintain engagement of the brake and to allow the operator to move to the right side of apparatus 10. Using foot action, the operator then may rotate crank 70 of drive assembly 60 to wind up the drive spring 140. Typically, the drive spring 140 may be of such a length that it may be completely wound four times about spring shaft 130 by approximately 16 turns of crank 70. The operator may then move back to a position between handles 41, 51 and lift the apparatus using handles 41, 51, so that supports 31, 32 are free of the horizontal surface so that the weight of the apparatus 10 and its load may be fully supported by wheel 35. Using the left hand, the operator may then lift up on brake handle 222 to release the locking action of locking pin 234 and allow the brake handle 222 to move downwardly to disengage the brake. The operator then may push the apparatus 10 in a forward direction, with the force provided by drive assembly 60 being applied to the wheel 35 by chain 39 to assist the operator in overcoming the inertia of the apparatus 10 and its load in achieving forward movement. The force provided by drive assembly 60 may be dissipated within 35 to 50 feet, but by the time the force is dissipated, the momentum of the apparatus 10 may be sufficient to allow the operator to easily continue forward movement of the apparatus 10.

As has been demonstrated, the present invention provides an advantageous apparatus and technique for assisting an operator in easily overcoming inertia of a heavily loaded wheeled apparatus so that it may be moved from place to place. While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A spring powered drive apparatus for a vehicle having at least one wheel, the apparatus comprised of
   a drive assembly comprised of
      a drive spring;
      a crank, wherein an external rotational force is applied to turn the crank;
      a freewheel sprocket coaxially mounted on an axle of the wheel, the freewheel sprocket freely rotating about the axle in a first direction without communicating force to the axle and fixedly rotating with the axle in a second direction;
      a first power transmission means disposed to communicate the rotational force to the drive spring to cause the drive spring to store rotational energy; and
      a second power transmission means disposed to communicate the rotational energy of the drive spring to turn in the second direction and to thus allow rotation of the wheel to dissipate the rotational energy stored in the drive spring; and
   a braking assembly for selectively preventing rotational movement of the wheel and allowing the wheel to rotate freely.

2. The apparatus described in claim 1, wherein the first power transmission means is selected from a group consisting of a bicycle chain, a belt, and a gear arrangement.

3. The apparatus described in claim 1, wherein the drive spring is a coil having a first end and a second end, the first end supported on a shaft by a fixed hub connected to the shaft and arranged to restrain rotation of the first end, the second end supported on the shaft by a movable hub arranged to rotate about the shaft and to allow rotational movement of the second end.

4. The apparatus described in claim 1, wherein the second power transmission means is a bicycle chain.

5. The apparatus described in claim 1, wherein the second power transmission means is selected from a group consisting of a bicycle chain, a belt, and a gear arrangement.

6. The apparatus described in claim 1, wherein the crank is adapted to receive the external rotational force that results from manual effort of a person.

7. The apparatus described in claim 6, wherein the crank is positioned and adapted to receive the external rotation force that results from the manual effort provided by a foot and leg of the person.

8. A manually powered vehicle comprising
   at least one wheel rotating on an axle;
   a drive assembly comprising
      an drive spring supported on a spring shaft by a fixed hub at a first end of the drive spring and a movable hub at a second end of the drive spring, the fixed hub restraining rotational movement of the drive spring and the movable hub allowing rotational movement of the drive spring;
      a crank, wherein an external rotational force is applied to rotate the crank;
      a first power transmission means disposed to communicate rotational force provided by movement of the crank to the movable hub in a direction that opposes the inherent resistance of the drive spring to rotational movement;
      a second power transmission means disposed to communicate rotational force exerted by the drive spring on the movable hub to the wheel; and
   a braking assembly for selectively preventing rotational movement of the wheel and allowing the wheel to rotate freely.

9. The apparatus described in claim 8, wherein the first power transmission means is a bicycle chain.

10. The apparatus described in claim 8, wherein the first power transmission means is a belt.

11. The apparatus described in claim 8, wherein the second power transmission means is a bicycle chain.

12. The apparatus described in claim 8, wherein the second power transmission means is a belt.

13. The apparatus described in claim 8, wherein the crank is operable by a foot of a person.

14. The apparatus described in claim 8, wherein the fixed hub is constrained from rotational movement by a fixed rail inserted through a base of the fixed hub, whereby the base may move longitudinally as the length of the drive spring changes while resisting rotational movement of the fixed hub.

15. A spring powered apparatus, comprising
   a wheelbarrow with a front end and a back end, the wheelbarrow having a frame supporting a load bearing container a distance from a horizontal surface, the frame held in spaced relationship with the horizontal surface by a support assembly positioned intermediate the front and back ends and a transversely mounted wheel positioned at the front end, the wheel having an axially mounted freewheel sprocket constrained from rotational movement in a first direction and freely rotating in a second direction, the frame having a handle at the back end, whereby an upward force on the handle will lift the support assembly from the horizontal surface to allow the wheelbarrow to be moved on the wheel;

a manually powered drive assembly comprising
a drive assembly frame affixed to the wheelbarrow;
a spring shaft transversely and fixedly supported by the drive assembly frame, the spring shaft surrounded by and supporting a drive spring, the drive spring with a first end constrained from rotational movement and a second end rigidly connected to a rotating hub axially supported by the spring shaft, the spring shaft connected to the freewheel sprocket by a first power transmission means;
a drive shaft transversely supported by and rotating within the drive assembly frame, the drive shaft having a winding means affixed to an end of the drive shaft, the drive shaft connected to the rotating hub by a second power transmission means, whereby rotation of the drive shaft results in a corresponding rotation of the rotating hub; and
a braking assembly for selectively preventing rotational movement of the wheel and allowing the wheel to rotate freely.

16. The apparatus described in claim 15, wherein the drive assembly frame is affixed to an underside of the wheelbarrow.

17. The apparatus described in claim 15, wherein the winding means is a crank, wherein the crank is configured for rotational movement when actuated by a force provided by a foot and leg of a person.

18. The apparatus described in claim 17, wherein the crank has three prongs.

19. The apparatus described in claim 15, wherein the first power transmission means is a bicycle chain.

* * * * *